US008663563B2

(12) United States Patent
Savran et al.

(10) Patent No.: US 8,663,563 B2
(45) Date of Patent: Mar. 4, 2014

(54) REFLECTIVE DIFFRACTOMETRIC HYDROGEL SENSOR FOR BIOLOGICAL AND CHEMICAL DETECTION

(75) Inventors: Cagri Savran, West Lafayette, IN (US); Chun-Li Chang, West Lafayette, IN (US); Zhenwen Ding, Santa Clara, CA (US); Babak Ziaie, W. Lafayette, IN (US); Andrew Ellington, Austin, TX (US); Venkata Naga Lakshmi Rekha Patchigolla, Columbus, IN (US)

(73) Assignees: Purdue Research Foundation, West Lafayette, IN (US); Board of Regents, The University of Texas System, Austin, TX (US)

(*) Notice: Subject to any disclaimer, the term of this patent is extended or adjusted under 35 U.S.C. 154(b) by 274 days.

(21) Appl. No.: 13/311,307

(22) Filed: Dec. 5, 2011

(65) Prior Publication Data

US 2012/0170050 A1    Jul. 5, 2012

Related U.S. Application Data

(60) Provisional application No. 61/419,656, filed on Dec. 3, 2010, provisional application No. 61/483,083, filed on May 6, 2011.

(51) Int. Cl.
*G01B 11/02* (2006.01)

(52) U.S. Cl.
USPC ....... 422/82.05; 422/68.1; 422/401; 422/421; 356/450; 356/498; 435/287.3; 435/287.7; 436/163; 436/164; 436/169

(58) Field of Classification Search
None
See application file for complete search history.

(56) References Cited

U.S. PATENT DOCUMENTS

| | | | |
|---|---|---|---|
| RE33,581 E * | 4/1991 | Nicoli et al. | 435/7.2 |
| 8,465,968 B2 * | 6/2013 | Groll et al. | 435/287.2 |
| 2009/0180932 A1 * | 7/2009 | Angeley | 422/82.05 |
| 2009/0310221 A1 * | 12/2009 | Aschwanden | 359/573 |

OTHER PUBLICATIONS

G. Ye and X. Wang, Glucose sensing through diffraction grating of hydrogel bearing phenylboronic acid groups, 2010, Biosensors and Bioelectronics 26: 772-777.*
Liu, J., et al., Functional Nucleic Acid Sensors; Chem. Rev. 2009, 109, 1948-1998.

* cited by examiner

*Primary Examiner* — Jill Warden
*Assistant Examiner* — Timothy G Kingan
(74) *Attorney, Agent, or Firm* — Ice Miller LLP

(57) ABSTRACT

A reflective diffractometric hydrogel sensor includes an upper layer, including a microfluidic chamber formed from a substantially transparent material and configured to contain a solution, a reflective diffraction grating positioned within the microfluidic chamber, the diffraction grating including a plurality of hydrogel strips configured to change in dimension in response to a stimulus, each hydrogel strip having a top surface coated with a reflective material and a bottom surface in contact with the upper layer substrate, and a reflective surface below the reflective diffraction grating wherein when a coherent light is incident upon and reflected from the upper layer at an angle substantially normal to the upper layer an interference diffraction pattern results, including a first diffraction mode, a light intensity of which indicates the relative distance between the top surfaces of the plurality of hydrogel strips and the reflective surface.

20 Claims, 13 Drawing Sheets

REFLECTIVE DIFFRACTOMETRIC HYDROGEL SENSOR FOR BIOLOGICAL AND CHEMICAL DETECTION

PRIORITY

The present U.S. patent application is related to, and claims the priority benefit of U.S. Provisional patent application Ser. Nos. 61/419,656, filed Dec. 3, 2010, and 61/483,083, filed May 6, 2011, the contents of which are hereby incorporated by reference in their entirety into this disclosure.

FEDERALLY SPONSORED RESEARCH

This invention was made with government support under grant number R21EB008154, awarded by the National Institutes of Health. The United States Government has certain rights in the invention.

BACKGROUND

Detecting minute amounts of biochemical entities like biomolecules and small molecules is an important function both in research and in clinical diagnostics. Such detections are directly related to early diagnosis and monitoring of diseases such as cancer and diabetes. The development of biochemical sensors that are sensitive, robust, easy to build, and easy to use is of great significance because most sensitive platforms available today are generally cumbersome, costly, fragile, and difficult to make and operate.

Although there has been a deluge of biomarker development during the past decade using mass spectrometry and other highly sensitive analytical tools, in real practice it is imperative to reduce the cost and enhance the robustness of the sensing platforms in order to eventually transition many of these discoveries to the bedside.

Today, enzyme-linked immunosorbent assays (ELISA) in various forms are the predominant immunological diagnostic assays used in most clinical settings. Typical ELISAs perform sufficiently to address a broad range of both qualitative and quantitative needs. However, the ELISA platform requires significant laboratory facilities, equipment and expertise. The typical detection limits of ELISA are in the high picomolar (pM) to nanomolar (nM) range. Although the lowest achieved sensitivity reported in the literature of about 4 pM reaches beyond the benchmark level, the conditions and equipment required are not practical. Furthermore, standard ELISAs require extensive washing steps and quantification, which requires a spectrophotometer. These requirements render ELISA systems relatively difficult to scale both down in size and up in number and relatively difficult to transform into direct use for point-of-care diagnostics.

One class of scalable state-of-the-art biosensors developed using micromachining techniques is the class of nanomechanical cantilevers. These sensors have been used to detect DNA, proteins and antibodies at concentrations that range from 100s of pM to 100s of nM. Previously, sensors were developed to detect proteins at sub-pM levels using cantilevers in conjunction with aptamers. Cantilever sensors are fragile and, in general, difficult to use and integrate. Researchers have also developed micro and nanoelectronic bio sensors that detect entities by their charge. However, these bio sensors are ultimately limited by the screening of the target entities by the surrounding ions, particularly under high ionic conditions, as well as by the requirement of extremely precise optimization for integration and readout.

Therefore, there is an ever-increasing need for biochemical detection systems that are not only sensitive but also relatively simple, robust and versatile because such systems are more disposed to miniaturization, commercialization and wide usage.

SUMMARY

A reflective diffractometric hydrogel sensor is described. The sensor includes an upper layer. The upper layer includes a microfluidic chamber formed from a substantially transparent material, bounded by an upper layer substrate on one surface, and configured to contain a solution, a reflective diffraction grating, positioned within the microfluidic chamber, comprised of a plurality of hydrogel strips each having a top surface and a bottom surface, wherein each top surface is coated with a reflective material and each bottom surface is in contact with the upper layer substrate, and the hydrogel strips being configured to change in dimension in response to a stimulus, a reflective surface below the reflective diffraction grating comprising the reflective coating of the plurality of hydrogel strips. When a coherent light is incident upon and reflected from the upper layer at an angle substantially normal to the upper layer an interference diffraction pattern results, comprised of a first diffraction mode, a light intensity of which indicates the relative distance between the top surfaces of the plurality of hydrogel strips and the reflective surface.

DETAILED DESCRIPTION

Figure 1:
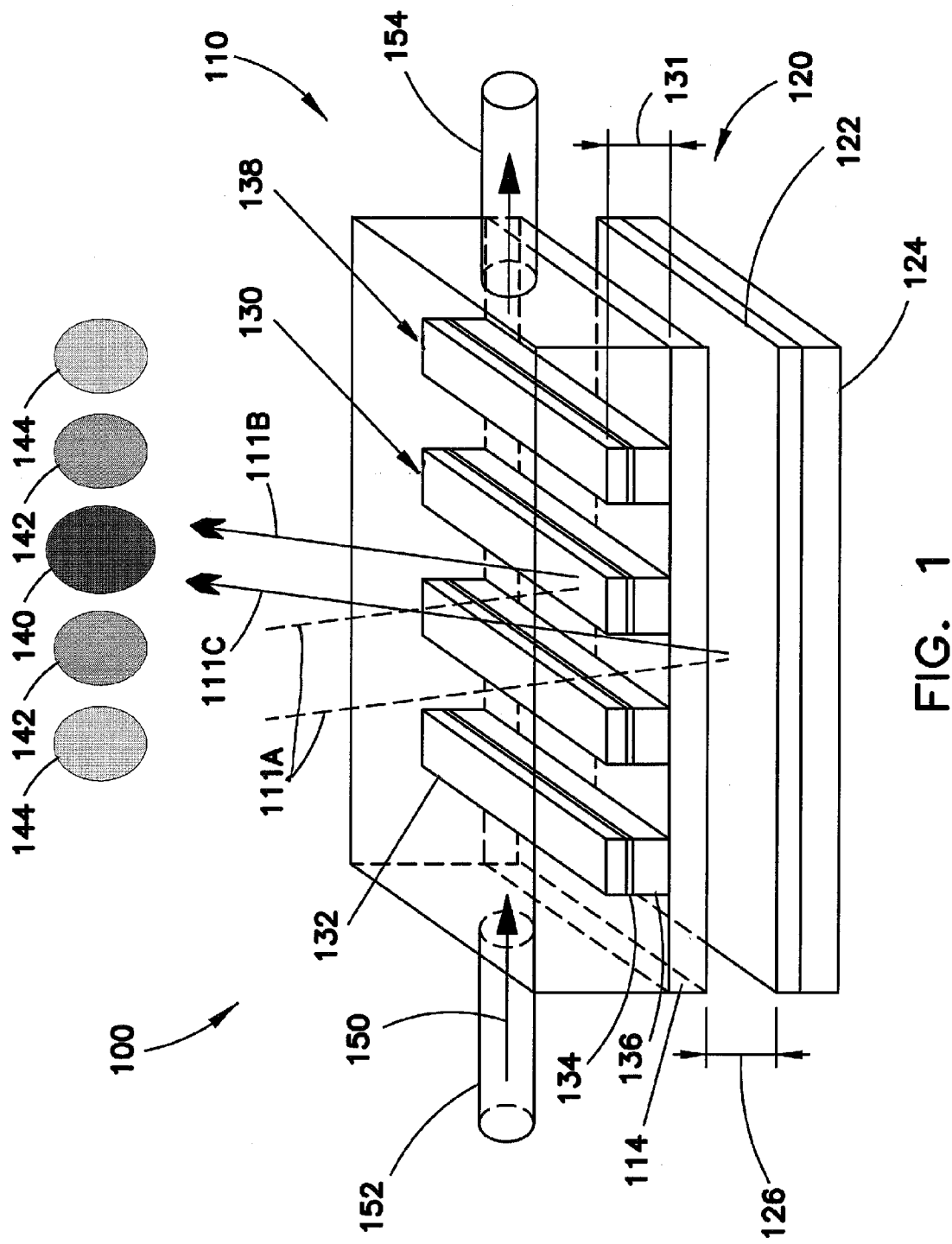
FIG. 1 depicts a schematic of a reflective diffractometric hydrogel sensor according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. It will further be understood that the present disclosure includes any alterations and modifications to the illustrated embodiments and includes further applications of the principles of the disclosure as would normally occur to one of ordinary skill in the art to which this disclosure pertains.

FIG. 1 depicts a schematic of a reflective diffractometric hydrogel sensor 100 according to at least one embodiment of the present disclosure. The sensor 100 may include two layers, an upper layer 110 positioned above a lower layer 120. The upper layer 110 includes a transparent microfluidic chamber 112 having a bottom side which is coupled to a transparent layer 114, such as glass. The upper layer 110 further includes an inlet channel 152 and an outlet channel 154 to enable passage of a subject fluid through the microfluidic chamber 112. The upper layer 110 further includes a reflective diffraction grating 130 positioned within the microfluidic chamber 112. The reflective diffraction grating 130 includes a plurality of hydrogel strips 138 patterned in the form of a diffraction grating, each coated with a reflective coating 132 on a top surface of the hydrogel strips 138. Although four hydrogel strips are shown, it should be appreciated that many more can be positioned in the diffraction grating 130. Each of the plurality of the hydrogel strips is mounted on the transparent layer 114. The lower layer 120 may include a flat reflective coating 122 on a substrate 124 positioned at an adjustable distance 126 away from the upper layer 110. An exemplary material of the reflective coating 122 may be gold.

In at least one embodiment according to the present disclosure, each hydrogel strip 138 includes a strip of hydrogel material 136. The hydrogel material may be a responsive polymer that alters its properties in response to specific stimuli, such as varying concentrations of biomolecules, glucose, pH, temperature, and other chemicals, biologicals and stimuli. Reversible volume change is a known response of hydrogel materials 136 to these various stimuli. By combining the reversible swelling characteristics of the hydrogel material 136 with an extremely sensitive motion detection method such as reflective diffractometry, the reflective diffractometric hydrogel sensor 100 can be used to interrogate minute changes of a target stimulus.

In the reflective diffractometric hydrogel sensor 100 according to the present disclosure as shown in FIG. 1, the top surface of each hydrogel strip 138 is coated with a reflective material 132, such as gold, titanium-gold alloy, or other non-reactive material with high reflectivity. Each hydrogel strip 138 may further include a layer of a passivation coating (not shown), e.g., parylene-C, as a moisture, chemical and dielectric barrier formed over the reflective coating 132. Since each hydrogel strip 138 is laterally constrained by the reflective coating 132 and by coupling to the transparent layer 114, the diffraction grating 130 changes volume primarily in the vertical direction as depicted by the arrows 131 when the hydrogel strips 138 swell or shrink in response to a stimulus. Subsequently, changes in the height (as depicted by the arrows 131) of the diffraction grating 130 can be measured with extremely fine precision using well-known reflective diffractometry techniques as described herein. Consequently, changes in the conditions within the microfluidic chamber 112 may be translated into changes in the height 131 of the diffraction grating 130 as illustrated in FIG. 1. By calibrating the diffractometric hydrogel sensor 100 response to a known target stimulus (e.g., solutions of known pH or known concentration of an analyte), precise quantitative measurements of the target stimulus may be made from the change in grating height.

Reflective Diffractometry

In principle, one could directly observe the volume change of a bulk hydrogel in solutions using a microscope. However, direct observation requires much larger volume changes and cannot resolve nanoscale motions that can be measured relatively easily and quantitatively by reflective diffractometry. In the reflective diffractometric hydrogel sensor 100 according to the present disclosure, the change in the height (as represented by the arrows 131) of the hydrogel diffraction grating 130 is monitored by reflective diffractometry. When the hydrogel diffraction grating 130 is illuminated by a coherent light source, a portion of incident light beams 111A is reflected as reflected beams 111B by the reflective coating 132 on the hydrogel strips 138, and the remaining portion passes through the transparent layer 114 and is reflected as reflected beams 111C by the reflective surface 122 disposed over the lower layer 120. It should be appreciated that the incident beams 111A can be configured to span the plurality of the hydrogel strips 138. The phase difference between the two reflected light beams 111A, 111B depends on the grating height 131. Because the incident light beam 111A is not transmitted through the hydrogel (due to the reflective coating 132), the phase difference is primarily dictated by the height of the hydrogel strips 138 and is not significantly influenced by the optical properties of the hydrogel material 136 itself. This is a significant advantage because the measured signal can be used directly to reveal the change in the height (as represented by the arrows 131) of the hydrogel diffraction grating 130. The phase difference produces interference between the reflected light beams 111B and 111C, resulting in a series of diffraction modes 140 ($0^{th}$ mode), 142 (pair of $1^{st}$ mode), and 144 (pair of $2^{nd}$ mode) as depicted in FIG. 1. It should be appreciated that the modes are resulting from interactions and optical mixing of reflective beams 111B and 111C with one another reflecting from each of the hydrogel strips 138 (although four hydrogel strips 138 are shown, more or less may be provided) and the reflective surface 122. It should also be appreciated that while a main mode 140 and two pairs of modes 142 and 144 are shown, more or less number of modes are possible. Obtaining a qualitative signal is relatively simple in that one can merely use a common laser pointer and observe the diffraction modes visually on a flat surface (e.g., paper, wall, or ceiling).

Figure 9:
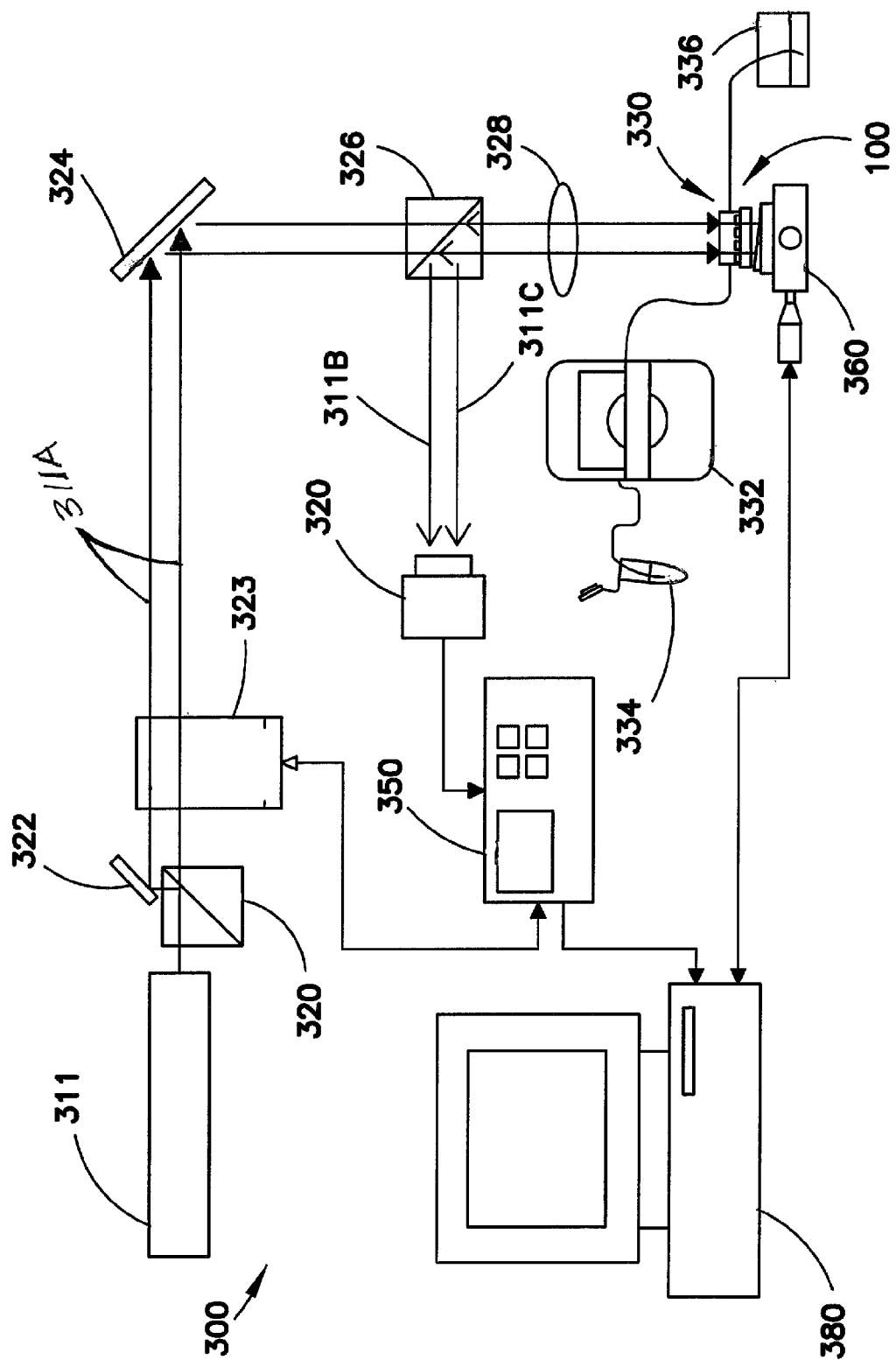
FIG. 9 depicts a schematic of a biological or chemical detection system according to the present disclosure.

To obtain a quantitative measurement of the change in grating height 131, the diffraction modes 140, 142, and 144 may be monitored with a photodetector (e.g., a photodetector 370 as depicted in FIG. 9). The intensity of the first diffraction mode 140 is represented by Eq. (1):

$$I_1 \propto \sin^2(2\pi n \delta/\lambda) \tag{1}$$

wherein I is the intensity of the diffracted light,
n represents the refractive index of the surrounding medium,
δ is the height of the grating, and
λ the wavelength of the laser beam. Therefore, the intensity of the first diffraction mode $I_1$ is proportional to grating height (as represented by the arrows 131), and changes in this intensity provide precise quantitative measurements of the changes in the grating height. Calibration using solutions of known concentration of analyte enables accurate quantitative measurement of the target analyte. Similarly, the intensity of the zeroth (and all the even numbered modes) is represented by Eq. (2):

$$I_0 \propto \cos^2(2\pi n \delta/\lambda) \tag{2}$$

Odd and even numbered modes change in opposite directions as the phase of the grating changes. This alternating effect may be used to determine whether a signal is caused by a genuine phase change or another unintended disturbance.

Diffractometer Biasing

A biasing scheme is devised in order to calibrate the reflective diffractometric hydrogel sensor 100 from a light diffraction perspective. By moving the diffractometric hydrogel sensor 100 horizontally on a sloped surface, known variations in height of each hydrogel strip 138 can be produced and thereby measured in order to calibrate the diffractometric hydrogel sensor 100. In addition to the mechanical calibration described further below, a chemical calibration is also devised in order to calibrate height changes in the hydrogel strips 138 as a result of introduction of a known analyte and a known height change as a result of response of the hydrogel strips 138 to the analyte. The chemical calibration is described further below.

Figure 4:
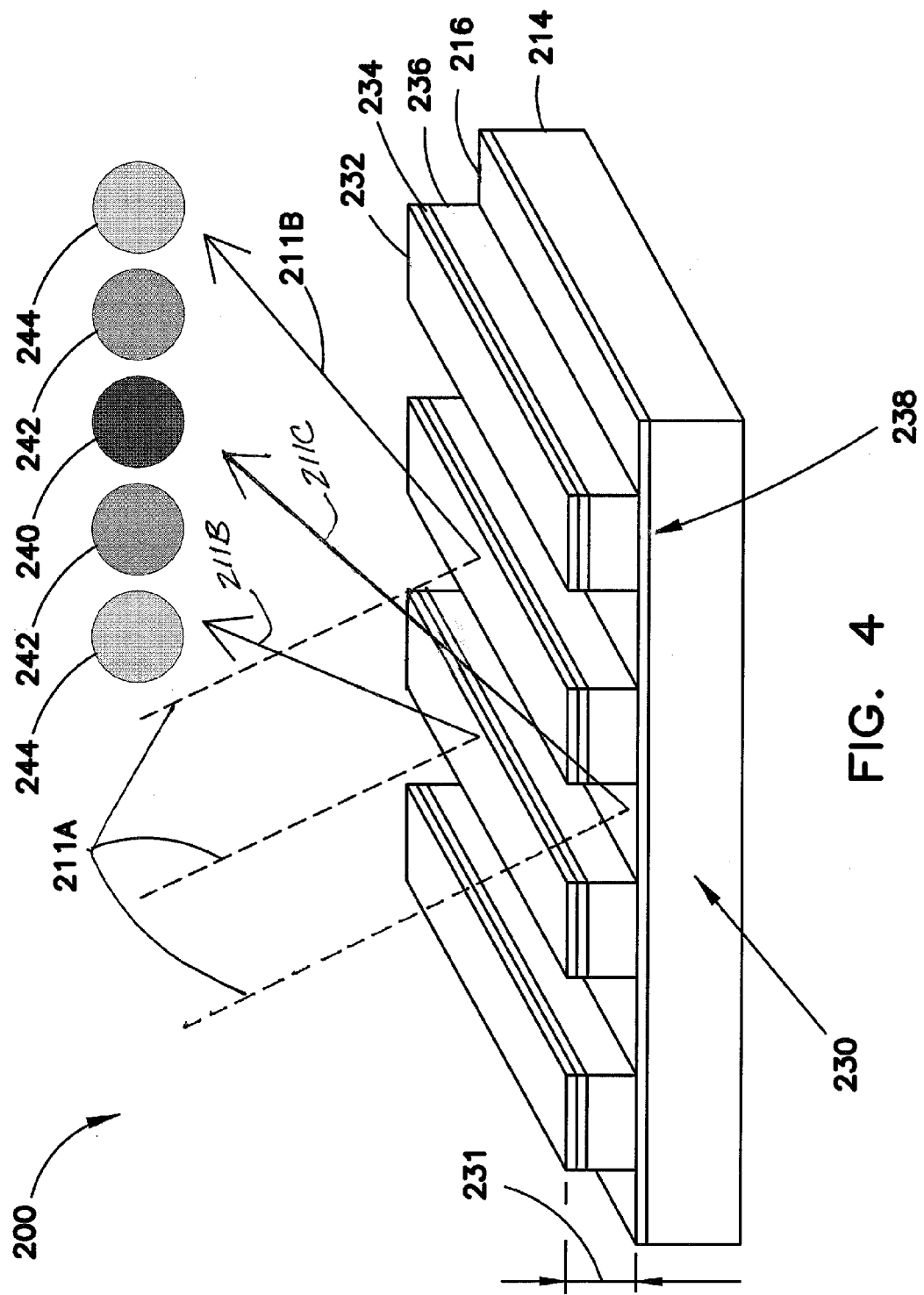
FIG. 4 depicts a schematic of a reflective diffractometric hydrogel sensor according to the present disclosure.
Figure 5:
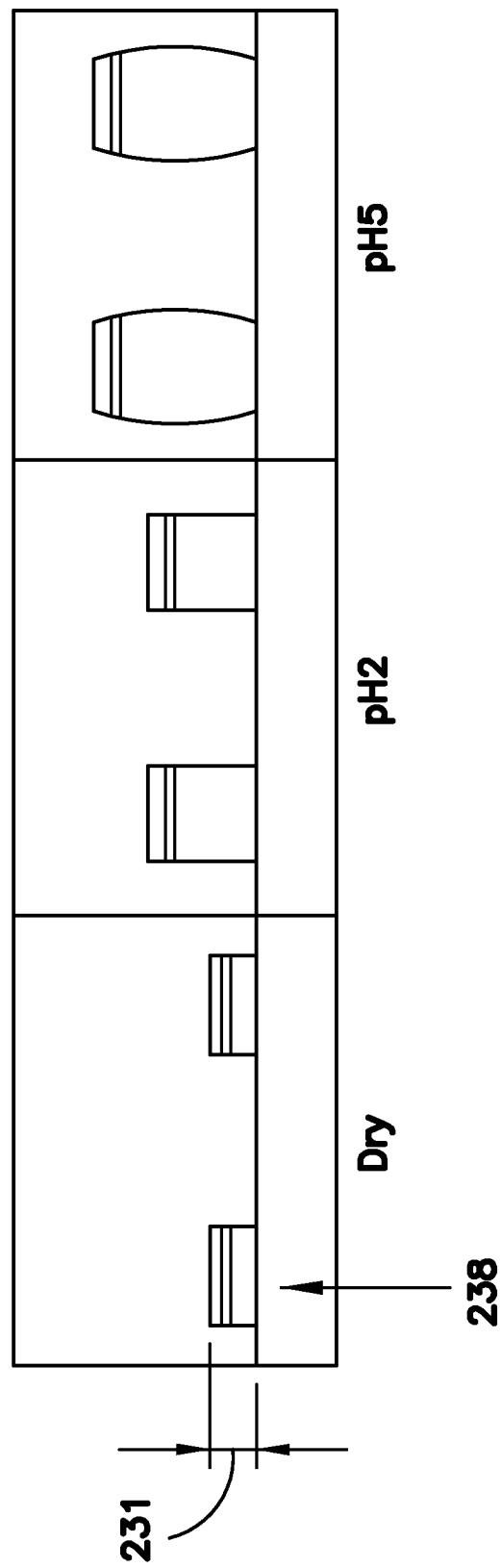
FIG. 5 depicts images from an optical microscope of a dry reflective hydrogel grating and the hydrogel grating exposed to pH 2 and pH 5 phosphate buffered saline solutions according to the present disclosure.

In the reflective diffractometric hydrogel sensor 100 according to the present disclosure as depicted in FIG. 4, the lower layer 120 enables baising of the sensor 100 to an operating range of maximum sensitivity. Biasing of the sensor 100 may be accomplished by mounting the lower layer 120 on a translation stage 160 at a slight tilt angle (e.g., 0.05° or a slope of $1/1200$). The translation stage 160 may be a computer-controlled and motorized translation stage, such as a Thorlabs® PT1/M-Z8 device, to enable very fine adjustment of an overall grating height 161, which is equal to the height 131 plus a distance 126. Since the lower layer 120 is mounted at a slight angle, micrometer-scale lateral movement of the translation stage 160 results into vertical adjustment of the overall grating height 161 on a nanometer-scale. This nanometer-scale precision of the overall grating height 161 enables the sensor 100 to be adjusted to operate within a range of maximum sensitivity as illustrated in FIG. 5. Alternatively, in at least one embodiment according to the present disclosure, the sensor 100 may be biased by mounting the bottom layer 120 to a vertical motion-controlling device similar to the translation stage 160 with nanometer precision that can adjust the overall grating height 161 directly.

Figure 2:
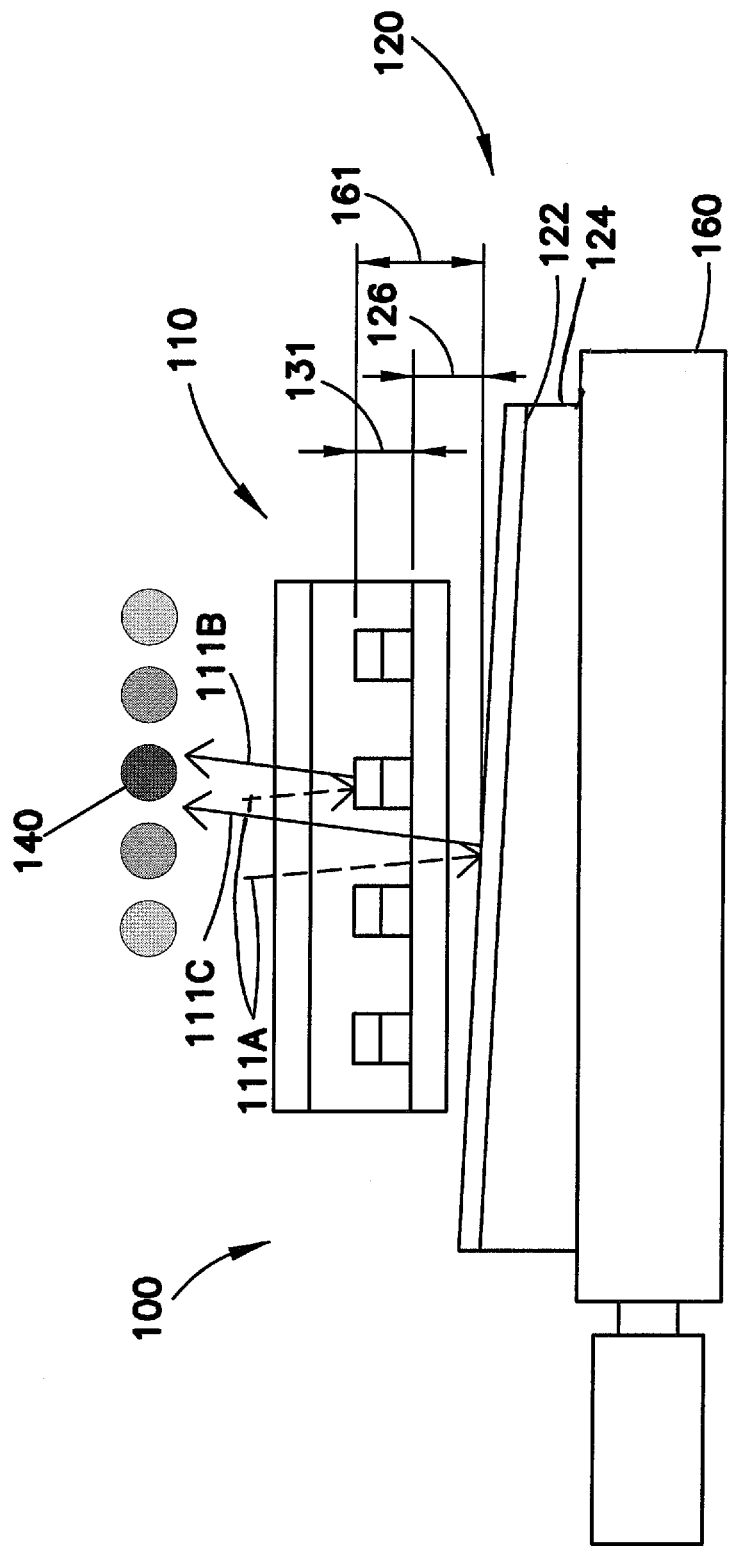
FIG. 2 depicts a schematic of biasable reflective diffractometric hydrogel sensor according to the present disclosure.
Figure 3:
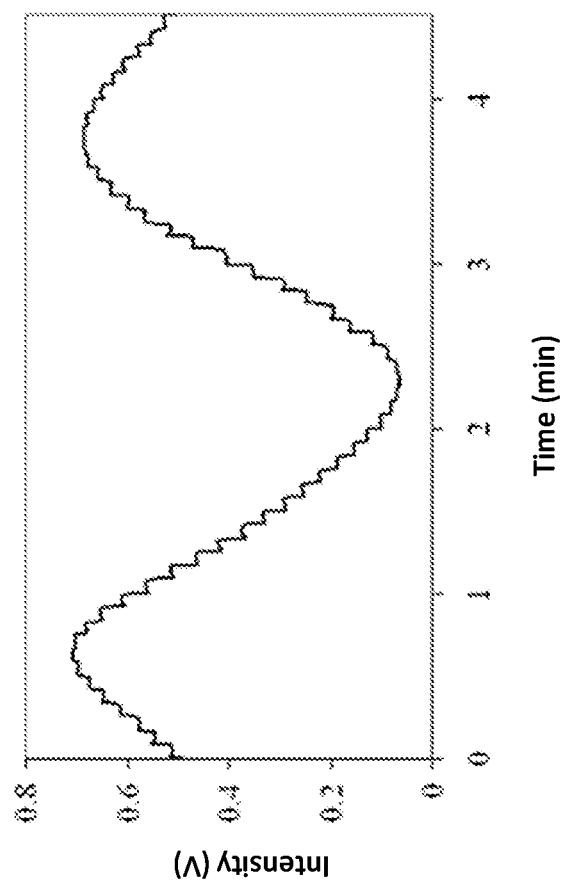
FIG. 3 depicts a graph of intensity measured in volts vs. time measured in minutes of biasing results of the biasable hydrogel grating of FIG. 4 according to the present disclosure.

FIG. 3 depicts a graph of intensity measured in volts vs. time measured in minutes of biasing results of the biasable hydrogel grating of FIG. 2, according to the present disclosure. FIG. 3 represents the results of a study in which the translation stage 160 was moved horizontally by 10 μm every 5 seconds while the diffraction intensity of the first diffraction mode 140 was recorded in real time. Due to the inclination of the lower layer 120, each horizontal step corresponded to about 8 nm change in the overall grating height 161. As depicted in FIG. 3, the diffraction intensity varies sinusoidally as a function of time as expected (i.e., as predicted by Eqs. 1 and 2). Moreover, smaller variations of the diffraction intensity were observed near the maximum and minimum points and larger variations near the midpoint for the same lateral displacements. Therefore, the sensitivity of the sensor 100 depends upon where it is operating within its range, and a biasable system is advantageous for detecting small motions that may result from small amounts of stimuli.

Using the lower layer 120 mounted to a translation stage 160 as a biasing element, the overall grating height 161 may be swept by at least half of the wavelength of the incident light 111A to interrogate the system and determine the points of maximum and minimum diffraction intensity. From these extremes, the sensor 100 may be biased to enhance the detection sensitivity by adjusting the translation stage 160 to operate at the most sensitive point, i.e., half way between maximum and minimum. For the example, in at least one embodiment of a reflective diffractometric hydrogel sensor 100 configured for pH detection (i.e., wherein the hydrogel material responds to changes in pH) where the operating point is very close to the minimum of the curve (i.e., minimum sensitivity), small pH shifts may be detected with an extraordinary sensitivity of $6\times10^{-4}$ pH units, alternative embodiments with a biasing element 160 may enhance the sensitivity by a factor of 15, bringing the pH sensitivity to $4\times10^{-5}$. Moreover, the axial positioning of the bottom layer 120 enables calibration of the sensor 100 as well as adjusts the sensitivity of phase difference.

In the reflective diffractometric hydrogel sensor 100 according to the present disclosure as shown in FIG. 2, the reflective diffractometric hydrogel sensor 200 does not include a lower layer 120. In such an embodiment, the reflective diffractometric hydrogel sensor 200 includes a transparent microfluidic chamber (not shown) bounded on a bottom side by a substrate 214, which is coated with a reflective material 216. The reflective material 216 may be gold, titanium-gold alloy, or other nonreactive material with high reflectivity. The sensor 200 further includes a reflective diffraction grating 230 positioned on top of the coated substrate 214. The reflective diffraction grating 230 includes a plurality of hydrogel strips 238 patterned in the form of a diffraction grating, coated with a reflective coating 232, such as gold, titanium-gold alloy, or other nonreactive material with high reflectivity. Each hydrogel strip 238 may further include a layer of a passivation coating, such as parylene-C, as a moisture, chemical and dielectric barrier between formed over the reflective coating 232. Since each hydrogel strip 238 is laterally constrained by the reflective coating 232 and by coupling to the coated substrate 214, the reflective diffraction grating 230 changes volume primarily in the vertical direction (i.e., direction of the height represented by arrows 231) when the hydrogel strips 238 swell or shrink in response to a stimulus. Because the reflective diffractometric hydrogel sensor 200 does not include a lower layer 120, biasing of the sensor 200 to an operating condition of optimal sensitivity may be accomplished by other methods, including, but not limited to, exposing the sensor 200 to known types and amounts of stimuli, by interrogating a fixed location by a coherent light beam of varying wavelength, or by scanning the chip surface with a coherent light beam. By the later method, since the area of the diffraction grating 230 is much larger than the incident light beam 111A, the grating height 231 may vary inherently from one area on the chip to another, thus serving as a biasing scheme. Aside from this biasing element, the fabrication, operation, and systemization of the sensor 200 may be the same as that of the reflective diffractometric hydrogel sensor 100.

Sensor Fabrication

With respect to the diffractometric hydrogel sensor 100 according to the present disclosure, fabrication methods involve squeeze-film casting of a pregel solution followed by a drying stage and then coating with parylene and then reflective coating. Subsequent lithography and etch steps result in hydrogel stripes. Where the top of each hydrogel strip 138 is coated with a thin reflective film, the sidewalls of each hydrogel strip 138 is not coated and is thereby exposed to the target analyte (e.g., $H^+$ or $OH^-$ ions in the case of pH stimuli) in the surrounding solution.

In reference to the hydrogel diffraction grating 130 according to the present disclosure, each hydrogel strip 138 may be 6 μm wide and separated by a gap of 14 μm from one another. In another embodiment, each hydrogel strip 138 may be 1 μm wide. Because the response time of the diffractometric hydrogel sensor 100 (depicted in FIG. 1) to changes in the analyte properties is limited mainly by the lateral diffusion of the analyte through the hydrogel material 136, thinner strip widths enable more rapid response times. The dimensions of the hydrogel strips 138 can be varied during fabrication.

In at least one embodiment of a diffractometric hydrogel sensor 100 according to the present disclosure, the microfluidic chamber 112 may be fabricated from acrylic, silicon, PDMS, or other suitable material that is substantially transparent to the coherent light source 111.

Hydrogel Materials

With reference to the diffractometric hydrogel sensor 100 according to the present disclosure that is sensitive to pH level, the hydrogel material 136 may be a poly methacrylic acid-co-acrylamide (poly(mAA-co-AAm)) material, which is highly responsive to changes in the concentration of $H^+$ and $OH^-$ ions in solution. With reference to the diffractometric hydrogel sensor 100 according to the present disclosure that is sensitive to the presence of glucose molecules, the hydrogel material 136 may be a poly(methylacrylamidophenylboronic acid-co-acrylamide) material, which is highly responsive to changes in the concentration of glucose in solution. Because the diffractometric hydrogel sensor 100 requires only very small amounts of a target solution, the sensor 100 may use such body fluids as tear, interstitial, or condensed breath to enable an accurate determination of glucose levels. Thus, the reflective diffractometric hydrogel sensor 100 is capable of measuring smaller concentrations of glucose in bodily fluids than traditional methods (e.g., μM compared to mM concentrations) and of doing so less invasively (i.e., condensed breath compared to drawn blood).

Figure 6:
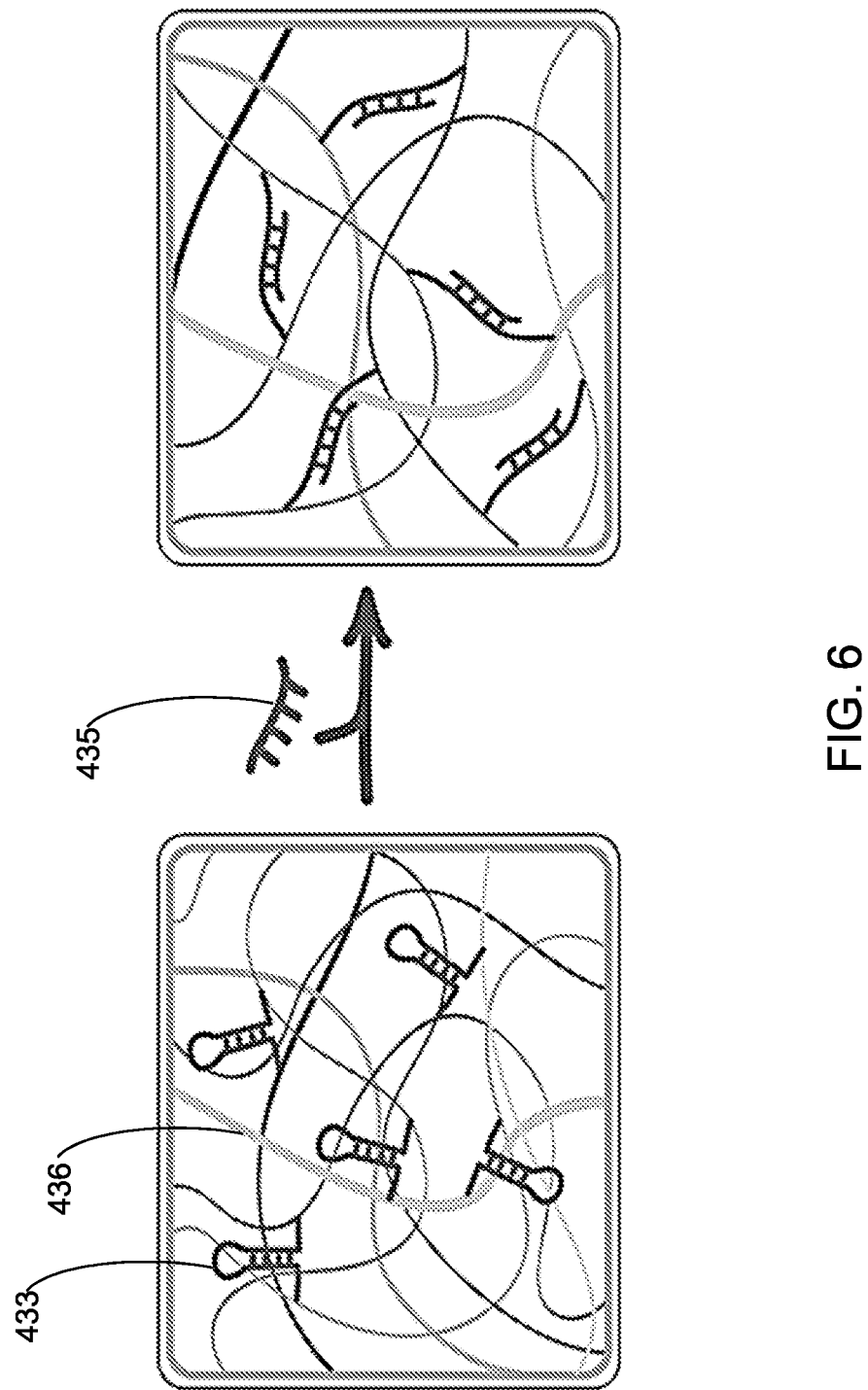
FIG. 6 depicts schematics representing hydrogel swelling by molecular beacons according to the present disclosure.

The reflective diffractometric hydrogel sensor 100 may be sensitive to a target biochemical, and the hydrogel material 136 may include an acrydite-oligonucleotide material capable of enabling a generalizable method for robust, low-cost, high-sensitivity bio sensing. Referring to FIG. 6, schematics representing hydrogel swelling by molecular beacons according to the present disclosure are depicted. An acrydite-oligonucleotide molecular beacon 433 may be used as a model system for analyte detection for using the hydrogel sensor 100 as a w for detecting the output of an entropy-driven DNA circuit for diagnostic applications. Molecular beacons 433 can be particularly useful because of the well-known mechanical transduction mechanism that they undergo upon recognizing a cognate analyte. Consequently, molecular beacons 433 enable opportunities for modeling how changes at the molecular scale within the hydrogel 136 can be translated to a scale detectable by the reflective diffractometric hydrogel sensor 100.

Therefore, it should be appreciated that a hydrogel material may be selected from a wide variety of materials suitable for a specific application. The basic requirement is that the hydrogel changes height when it comes in contact with the analyte for which it is intended.

It should also be appreciated that the reflective diffractometric hydrogel sensor 100 can be used to detect presence of a wide variety of chemical and biological items (target stimuli) including but not limited the analyte: proteins, small molecules, ions, peptides, enzymes, DNA, RNA, antibodies, antigens, cells, viruses and bacteria, as well as other stimuli such as pH and temperature.

Figure 7:
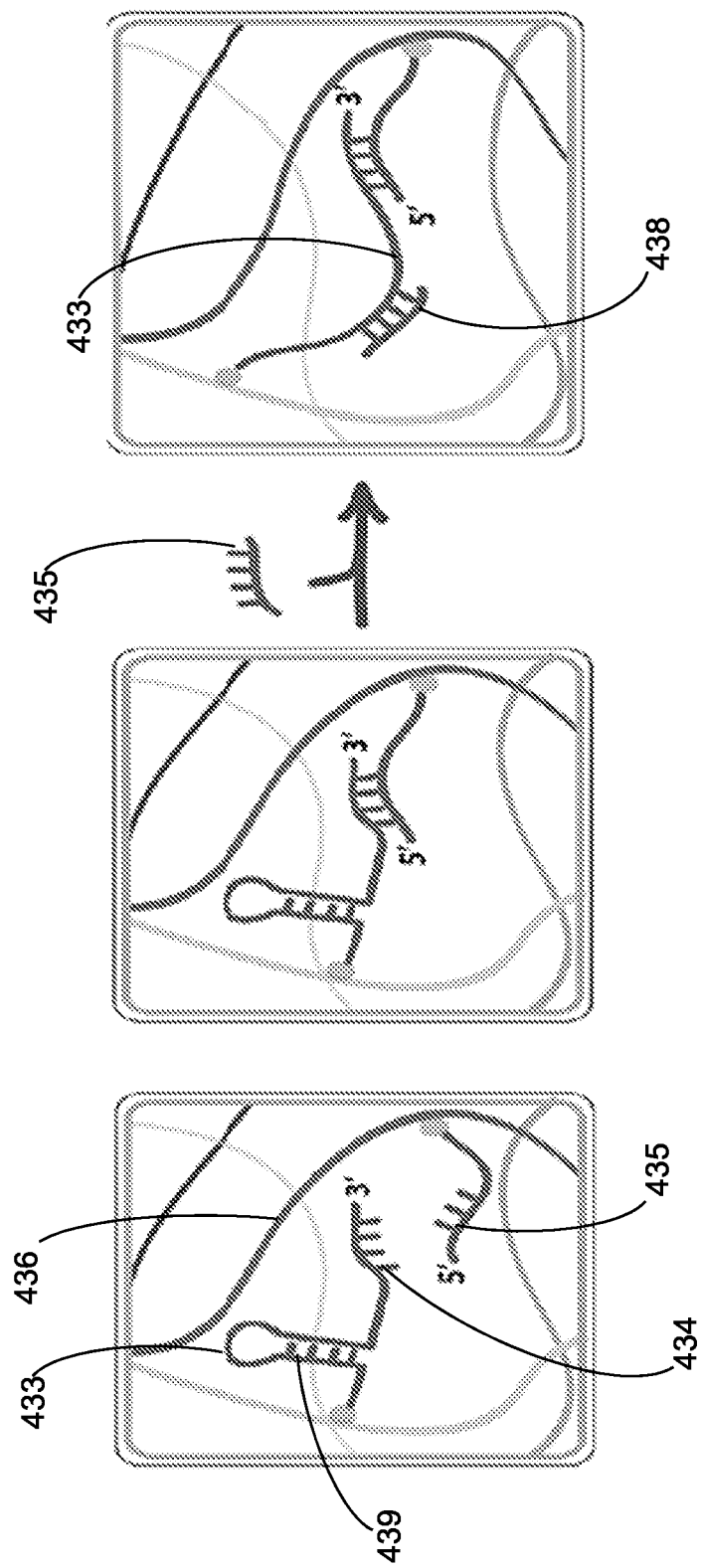
FIG. 7 depicts schematics representing grafting of beacons into hydrogels according to the present disclosure.

In at least one embodiment according to the present disclosure, standard molecular beacons 433 may be adapted to the acrydite platform as depicted in FIG. 7. Referring to FIG. 7, schematics representing grafting of beacons into hydrogels according to the present disclosure are depicted. As shown in FIG. 7, standard molecular beacons 433 may be synthesized with 5'-acrydite effectors 435 to enable direct introduction into the hydrogel material 136 (see FIG. 1). In at least one embodiment, the 3'-end 434 of the molecular beacon 433 may include a single-stranded region that enables the 3'-end 434 to hybridize to a second 3'-labeled oligonucleotide 438. By this process, the 3'-labeled oligonucleotide 438 may be co-polymerized into the hydrogel, resulting in the 3'-end 434 of the immobilized molecular beacon 433 hybridizing to the immobilized oligonucleotide 438 and leading to extensive cross-linking of the hydrogel material 136. The fabrication of the hydrogel gratings can be the same as the pH-responsive hydrogel except, the methylenebisacrylamide used previously can now be substituted with acrydite-oligonucleotides. Therefore, the beacon grafting can be done in situ i.e., during grating fabrication.

With reference to the diffractometric hydrogel sensor 100 according to the present disclosure, a variety of parameters within the hydrogel material 436 may be adjusted, including the length of the effectors 435, the loop of the molecular beacon 433, and the molecular beacon stem 439, and the degree of hybridization between the 3'-end 434 of the molecular beacon 433 and the co-immobilized oligonucleotide 438 as shown in FIG. 7. In at least one embodiment, the molecular beacons 433 may be embedded in different hydrogel materials 436 with different ratios of cross-linking effectors 435 and oligonucleotides 438.

In at least one embodiment according to the present disclosure, the target analytes 150 may be suspended in clear buffer solutions, in calf serum (which is a model complex background), as well as in other complex mixtures that inherently contain the target analytes to be detected. Since the diffractometric hydrogel sensor 100 may be calibrated directly via Eqs. 1 and 2 to reveal motion due to an effector input 435, dose-response curves may be generated that will directly correlate effector concentration and the corresponding change in the grating height 131.

Figure 8:
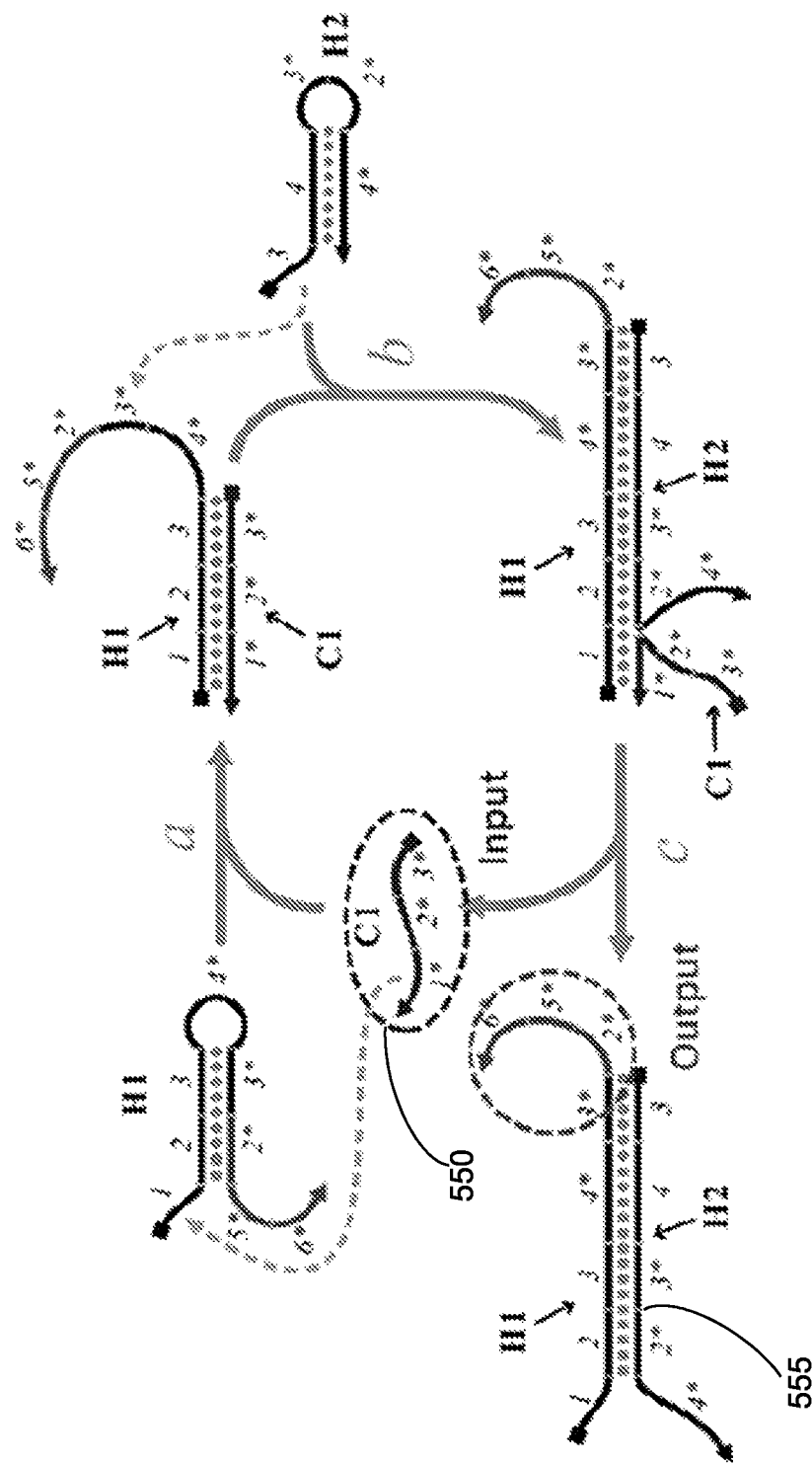
FIG. 8 depicts a schematic for a DNA circuit amplification scheme according to the present disclosure.

With reference to the diffractometric hydrogel sensor 100 according to the present disclosure, once the performance of the molecular beacon 433 and its effector 435 are optimized, detection to an entropy-driven DNA circuit may be coupled to the hydrogel material 136 (see FIG. 1) as depicted in FIG. 8 to enable chemical-based signal amplification. Referring to FIG. 8, a schematic for a DNA circuit amplification scheme according to the present disclosure is depicted. Utilizing the scheme depicted in FIG. 8, the reflective diffractometric hydrogel sensor 100 may resolve dimension changes that are up to five orders of magnitude smaller than swellings found in pioneering smart hydrogel studies which were measured visually under a microscope (in some studies μMs of target concentrations were observed to cause some 100 μm changes in hydrogel dimension). Thus, low levels of target concentrations (e.g., picomolars or less) may be detected without considering any additional amplification. Nonetheless, the resolution may be even better depending on the effectiveness of the circuit amplification which is expected to increase the swelling of the hydrogel material 136.

As depicted in FIG. 8, an entropy-driven circuit may exploit strand displacement reactions on long-lived, but metastable, DNA hemiduplexes. An initial signal sequence 550 initiates a cascade of strand-displacement reactions a, b, and c that eventually result in signal amplification and the release of a second sequence 555 that can be detected by the hydrogel sensor 100 (see FIG. 1). The isothermal enzymeless system depicted in FIG. 8 is suitable for signal amplification because of its relevance to developing diagnostics for point-of-care settings, which favor low-cost methods that do not require long logistics trails, such as freezers. In addition to robust signal amplification and enhanced sensitivity, another advantage of using the described entropy-driven circuit is that any variety of relevant input sequences, such as drug resistant alleles of *M. tuberculosis* for instance, may be converted directly to the same output sequence, thus enabling the same hydrogel material 136 to be modularly adapted to the detection of many different species.

Furthermore, a diffractometric hydrogel sensor 100 may be combined with a sequence amplifier as described herein and packaged in a one-use format. In at least one alternative embodiment, additional non-nucleic acid target analytes may be detected using aptamer beacons, or any other suitable molecules that undergo mechanical transductions upon recognizing a target analyte. Therefore, the reflective diffractometric hydrogel sensor 100 provides a generic platform for biological or chemical detection that may be adapted to a hydrogel material 136 (see FIG. 1) that may be developed to respond as described herein to a target stimulus.

System Description

Referring to FIG. 9 a schematic of a analyte detection system 300 according to the present disclosure is depicted. In at least one embodiment according to the present disclosure, a biochemical detection system 300 includes a collimated coherent light source 310 capable of illuminating a reflective diffractometric hydrogel sensor 100 (see FIG. 1) and a photodetector 370 capable of measuring light produced by the coherent light source 310 and reflected from the hydrogel sensor 100. The coherent light source 310 may be a laser, including but not limited to a helium-neon laser, a light-emitting diode, or a source outside the visible light spectrum. With reference to the analyte detection system 300, a 100 µm diameter laser beam with a wavelength of 632.8 nm may be used to illuminate at least a portion of the hydrogel diffraction grating 130. The influence of small defects or changes among individual hydrogel strips 138 is minimal and alignment tolerances may be relaxed because these effects are averaged out by illuminating a relatively large number of hydrogel strips 138. In addition, according to diffraction theory, illuminating a relatively large number of hydrogel strips 138 in the same area results in wider separation of the diffraction modes, thereby facilitating the isolation of individual diffraction modes for measurement.

With reference to the analyte detection system 300 according to the present disclosure as depicted in FIG. 9, the incident light beam 311A produced by the coherent light source 310 may be directed to the diffractometric hydrogel sensor 100 at an angle substantially normal to the hydrogel grating 130 by one or more optical elements. These optical elements may include beam splitters 320 and 326, reflective mirrors 322 and 324, and a focusing lens 328. The focusing lens 328 may be a convex lens capable of focusing the incident light beam 311A to a diameter of about 100 µm (or less or more depending on the exact size of the grating structure) upon the diffractometric hydrogel sensor 100. It should be appreciated that the system 300, unlike other diffraction-based methods, is not based on detecting the light transmitted through the hydrogel because of the reflective coatings 132 and 122. Instead, the sensor 100 is a reflective diffraction grating and measures phase that is caused only by the deflection of the hydrogel strip top surface 132 (beam 311B) with respect to the lower layer surface 122 (beam 311C).

In the analyte detection system 300 according to the present disclosure as depicted in FIG. 9, the photodetector 370 may be a charge-coupled device (CCD) camera, a photodiode, or any device capable of measuring the first or higher order diffraction modes (additional photodetectors can be introduced to detect multiple modes). A number of optical elements such as the beam splitter 326 may be included to direct light reflected from the sensor 100 to the photodetector 370. In addition, an optical chopper 300 and a lock-in amplifier 350 may be included to filter the diffraction signal from the sensor 100 to reduce noise.

The signal measured by the photodetector 370 can be collected by the lock-in amplifier and recorded by a data acquisition device 380, such as a computer with a LabView® software interface or a microprocessor. The translation stage 360 may be operably connected to the data acquisition device 380 to enable axial positioning and biasing. The operation of the translation stage 360 may be controlled in an open-loop configuration because the diffractometry described herein is stable, such that open-loop control generally should be sufficient, and because commercial translation stages with close-loops are more expensive.

As depicted in FIG. 9, the analyte detection system 300 includes a fluidic system 330 operably connected to the microfluidic chamber 112 of the sensor 100. The fluidic system 330 may include a reservoir 334, a pump 332 (e.g. a peristaltic pump), a waste container 336, and lines capable to passing an analyte solution 150 between these parts. The inlet 152 of the microfluidic chamber 112 may be fluidly coupled to the pump 332, which may be fluidly coupled to the reservoir 334 that contains the analyte solutions. The outlet 154 of the microfluidic chamber 112 is drained to a waste container to form an open-loop fluidic system 330. Alternatively, the outlet 154 may be fluidly connected to the reservoir 334 in a closed-loop configuration.

The analyte detection system 300 according to the present disclosure as depicted in FIG. 9 may be miniaturized into a portable or hand-held package that contains all of the fluidic, optical and the electronic components. In such an embodiment, the microfluidic chamber 112 may be configured to minimize the amount of target solution required for characterization and, for example, may not include an outlet 154, a reservoir 334, or a peristaltic pump 332.

Reference Comparison

Figure 10:
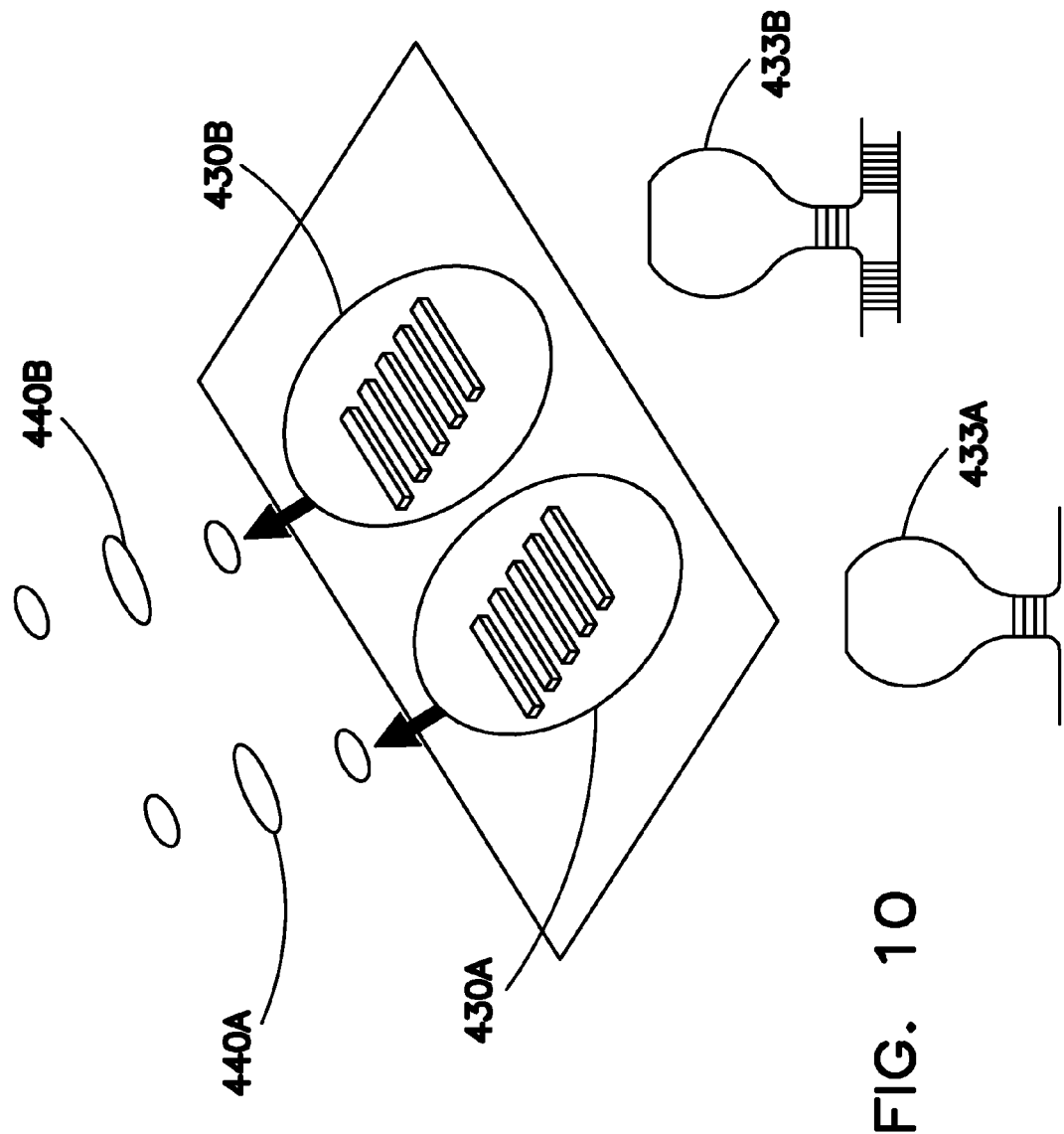
FIG. 10 depicts a differential detection and diffraction pattern of two adjacent gratings according to the present disclosure.

To improve the specificity and selectivity of the diffractometric hydrogel sensor 100, an inherent reference may be included in the biochemical detection system 300 according to the present disclosure. As depicted in FIG. 10, two diffraction gratings 430A and 430B located side by side may serve as a sensor-reference pair in which the left-hand diffraction grating 430A is the sensor configured to respond to target analytes and the right-hand diffraction grating 430B is the reference configured to not respond to target analytes. Although configured to not respond to target analytes, the diffraction grating 430B is configured to respond to other nonspecific effects to the same degree as the sensor grating 430A. For example, nonspecific effects may include pH, temperature, background solution agents, other stray entities, or the like. Both diffraction gratings 430A and 430B are illuminated simultaneously such that each grating forms its own diffraction pattern with separate first diffraction modes 440A and 440B. Simultaneous illumination of each diffraction grating may be achieved by splitting the incident light beam 311A with the beam splitter 320 as depicted in FIG. 9. Alternatively, both diffraction gratings may be illuminated by a single beam wide enough to illuminate at least a portion of both gratings. The first modes 440A and 440B in the resulting diffraction patterns may be detected by the photodetector 370 and subtracted from one another in real time by a data acquisition system 380 or equivalent. Subtraction of the two responses 440A and 440B produces a differential signal representing only the effect of the target analyte binding to the sensor grating 430A.

A reference grating 430B may be similar to the sensor grating 430A in several fashions except for its ability to respond to the target analytes. The two diffraction gratings 430A and 430B may be fabricated simultaneously using the same hydrogel material 136. Since each grating 430A and 430B may be subjected to the same fabrication steps and are positioned in close proximity, each may have the same functional beacon. The reference grating 430B may be prepared by selectively exposing it to micro-droplets containing a single-stranded DNA sequence 433C with a complementary sequence to the bottom portion of the beacon 433B as shown in FIG. 10. Selective exposure may be accomplished using an micro-inkjet printing system or another fluid dispensing system and acts to prevent those molecular beacons 433B from binding to target analyte molecules and opening up. The length of this DNA strand 433C may be experimentally optimized. The majority of both gratings 430A and 430B may be composed of the hydrogel material 136, which behaves the same way in both gratings in relation to drift and nonspecific effects. Therefore, subtracting the first diffraction mode signals 440A and 440B results in a differential signal that only includes the beacon effects on the sensor 100. Therefore, molecular targets can be detected with enhanced selectivity using the inherently differential reference system described herein based on novel molecular or aptamer beacon hydrogels. With the combination of the ability to resolve extremely small motions and the DNA circuit-based amplification protocol, small target concentrations may be detected. Given the simplicity and robustness of the fabrication and operation of at least one embodiment of the biochemical detection system 300, the platform can be widely used in multiple fields for detection of various target analytes by using specific hydrogels responsive to various target stimuli.

Characterization of the System

As depicted in FIG. 5, optical microscopic images of a dry hydrogel grating 230 and those exposed to pH 2 and pH 5 phosphate buffered saline (PBS) solutions confirm that the grating height (as referenced by arrows 231) increases significantly with pH. Although the width of the hydrogel strip 238 changes slightly, this effect is less significant due to the reflective surface constraints 232 and 216 at the top and the bottom. Upon shining a laser beam on the grating surface, the reflected beams from the gold coated hydrogel stripes and the underlying flat substrate interfere and form a series of diffraction modes. The intensity of the first diffraction mode is represented by Eq. (1), provided above.

Figure 11:
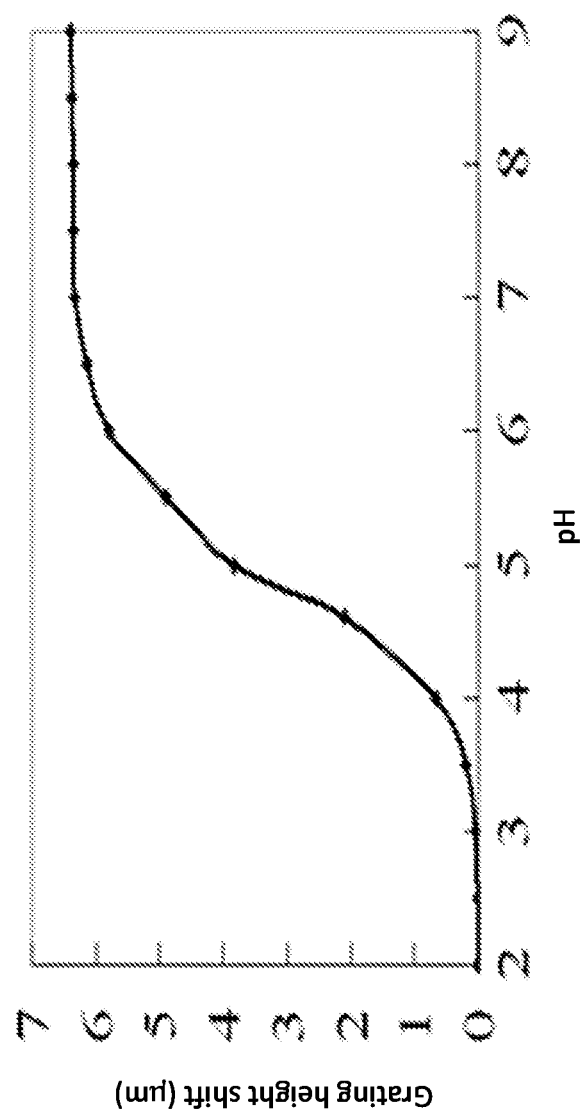
FIG. 11 depicts a graph of rating height shift measured in μm vs. pH showing dependence of the hydrogel grating height on pH according to the present disclosure.

Performance of the reflective diffractometric hydrogel sensor 200 (see FIG. 4) is illustrated in FIG. 11, which graphs intensity of the first diffraction mode 140 as measured by a photodetector as the pH of a PBS buffer is gradually increased in increments of 0.5 units from pH 2 to pH 9 by adding HCl or NaOH. The final pH values may be measured using a commercially available pH meter. The results are depicted in FIG. 11. The signal can be calibrated for grating height shifts according to Eq. (1). The response of the sensor 200 in FIG. 11 shows excellent agreement with pH-sensitive hydrogel measurements performed by traditional methods.

Figure 12:
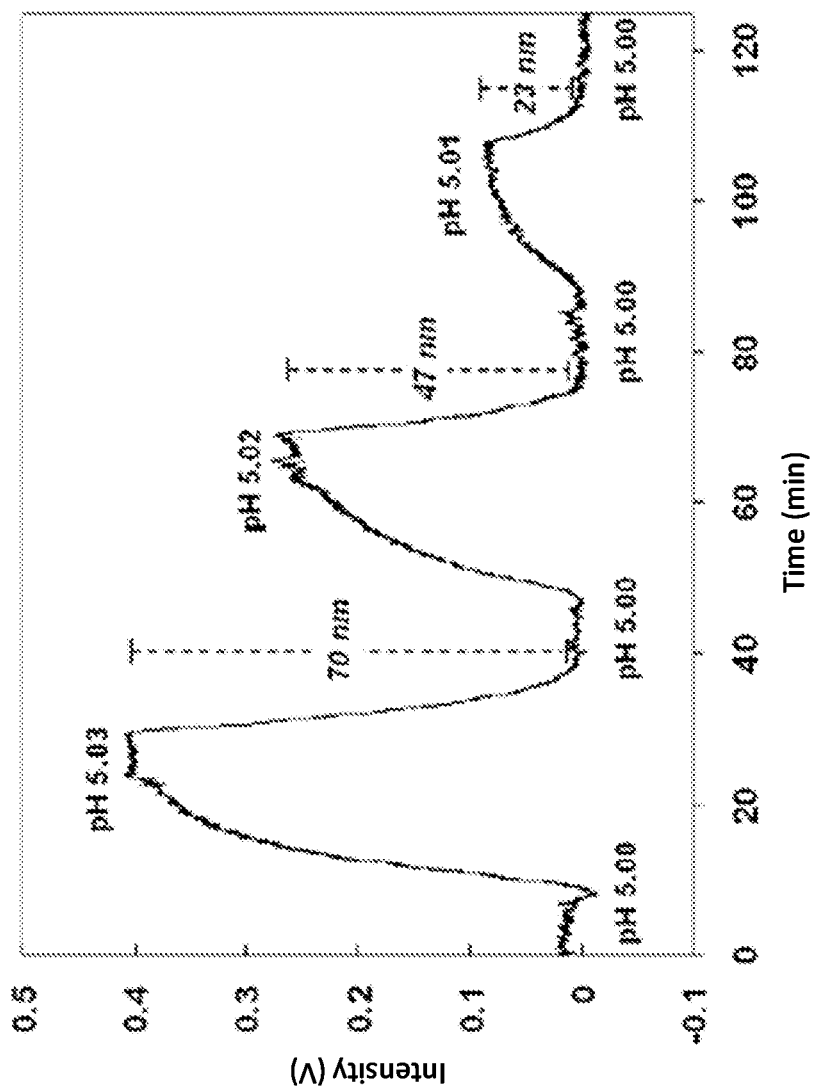
FIG. 12 depicts a graph of intensity measured in volts vs. time measured in minutes of response of intensity of the diffracted light to small pH changes according to the present disclosure.

Much smaller pH shifts may be measured by the disclosed reflective diffractometry method as illustrated in FIG. 12. Referring to FIG. 12, a graph of intensity measured in volts vs. time measured in minutes of response of intensity of the diffracted light to small pH changes according to the present disclosure is depicted. Small pH variations of 0.01 pH units may be measured. As shown in FIG. 3, diffraction mode intensity 140 can be measured when PBS solutions with pH 5.03, pH 5.02 and pH 5.01 are introduced into the fluidic chamber 112 by alternating with PBS solutions of pH 5 between each step. The resulting grating height shifts were calibrated using Eq. 1 to be 70, 47 and 23 nm, indicating a substantially linear relation around pH 5 with a sensitivity of 2300 nm/pH. Moreover, the root-mean square (RMS) noise was calculated to be around 5 mV over a 10 minute-period, which yields a signal-to-noise ratio of 16 at pH 5 for the 0.01 pH variation measurement. Therefore, the pH resolution of this diffraction sensor is about $6 \times 10^{-4}$ pH units at pH 5 with a deflection resolution of about 2 nm over 10 minutes, which may be even smaller for measurements over shorter times.

Despite the long reaction time of the hydrogel strips 138 toward pH shifts, this demonstrated sensitivity is already superior to many commercial pH meters today. Also important, this calculated sensitivity is conservative because the starting grating height 231 at pH 5 happened to be at a relatively insensitive point of the sensor 200, which in this embodiment did not include a baising element.

Various experiments can also be performed to investigate the detection limit of a diffraction hydrogel sensor 100 by measuring small pH variations such as 0.01 or 0.001. Since the sensor 100 includes a biasing element 160, upon equilibrating the sensor 100 with pH 5, the platform can be characterized using the bias element 160 to find the maximum and minimum value of the diffraction intensity (i.e., maximum and minimum of Eq. 1), and then the sensor 100 can be offset to the maximum sensitivity point (middle of the sinusoidal curve as depicted in FIG. 3). Following that step, pH 5.001 PBS may be introduced into the microfluidic chamber 112 for detection. The corresponding shift in grating height 131, signal to noise ratio and detection limit can be further calibrated.

Operation

Figure 13:
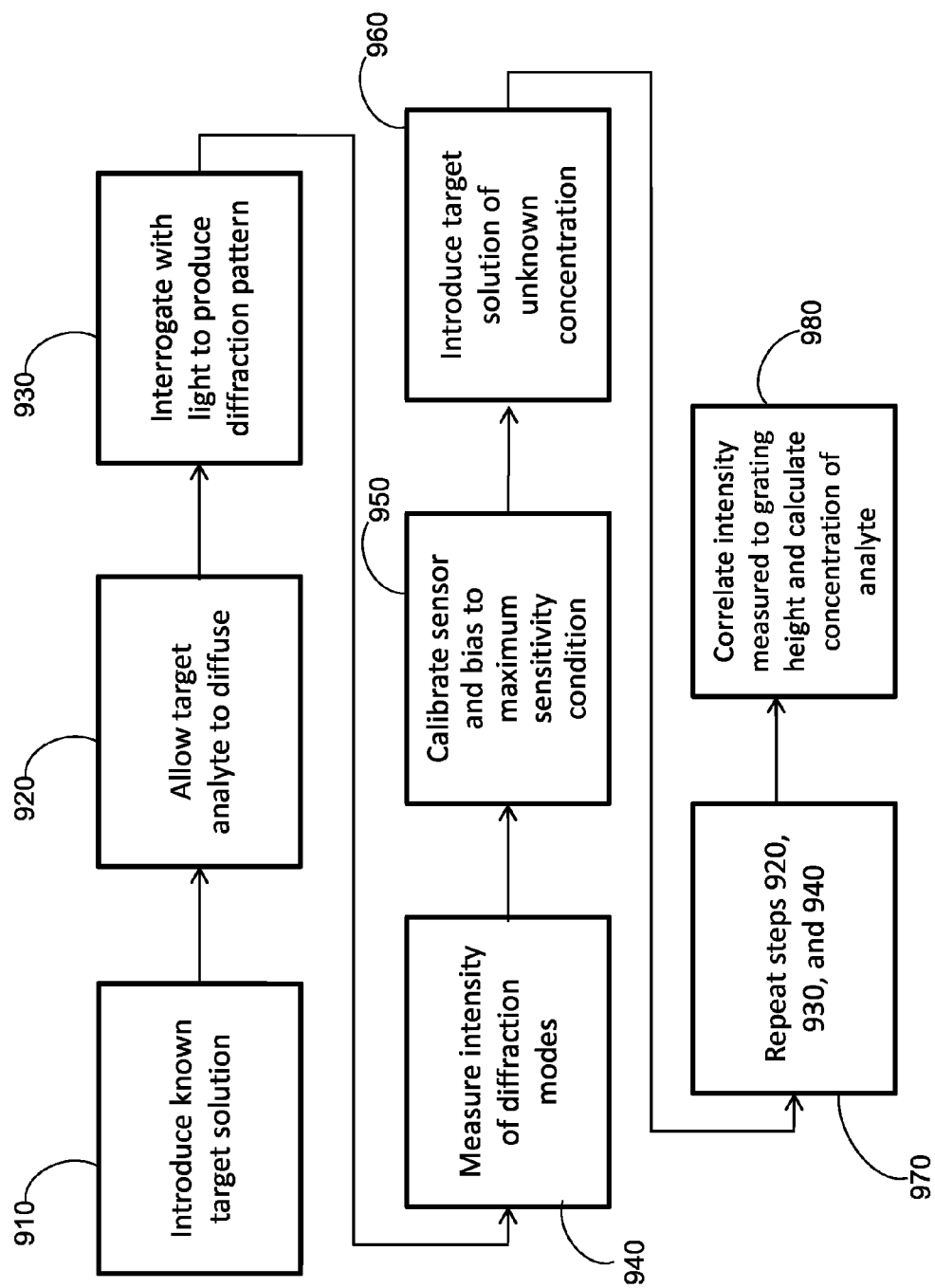
FIG. 13 depicts a method of using an analyte detection system according to the present disclosure.

Referring to FIGS. 1, 9, and 13, in operation a solution containing a known concentration of a target analyte 150 may be introduced into the microfluidic chamber 112 via inlet 151 (step 910). After an appropriate residence time during which the solution fully diffuses into the hydrogel strips 138, the diffraction grating 130 is interrogated with a coherent light source 311, which may be focused on the diffraction grating 130 by a focusing lens 328 (step 920). The light 111B reflected from the grating and the lower reflective surface 122 interfere to form a diffraction pattern due to the distance between the hydrogel strip reflective surface 132 and the lower reflective surface 122 and their resulting phase difference (step 930). The first diffraction mode 140 of the pattern is measured by a photodetector 370 (step 940). (Alternatively, multiple modes can be measured by multiple photodetectors. For example, an odd numbered mode such as the $1^{st}$ mode and an even numbered mode such as the $0^{th}$ or the $2^{nd}$ mode to verify that the measured signal is a result of genuine phase difference.) While the grating 130 is interrogated by the coherent light source 311, the biasing element 360 may be adjusted to determine the point of maximum sensitivity of the system (step 950). Using that operating point, solution containing an unknown concentration of a target analyte 150 may be introduced into the microfluidic chamber 112 via inlet 151 (step 960), and the light interrogation process is repeated (step 970). The change in the measured intensities of the resulting diffraction modes 140, 141, 142 is then used to calculate the unknown concentration of analyte (step 980).

The analyte detection system 300 according to the present disclosure provides several advantages over prior art systems. First, due to the ability of reflective diffractometry to detect extremely small motions, target stimuli can be detected in extremely small quantities. Due to the reflective nature of the system, the incident light is not transmitted through the hydrogel strip and hence the measured signal is not affected by the optical parameters (such as the refractive index) of the hydrogel itself and represents only its volume change which significantly simplifies calibration and reduces disturbances and unwanted signals that may be caused by optical changes in the hydrogel. Second, obtaining a measurement is advantageously simple as it only requires illumination with a coherent light source with no need for more sophisticated controls, such as on-chip circuit fabrication. Third, since multiple grating strips are illuminated at each time, alignment tolerances are relaxed and errors due to small variations from one strip to another are averaged out. Fourth, the system according to the present disclosure has lower fabrication cost because the hydrogel thickness does not need to be precisely controlled since movable bottom layer serves as a biasing element to compensated for variations. Fifth, a variety of parameters, including but not limited to temperature and pH, and a variety of agents, including but not limited to glucose, oligos, and antigens may be detected using hydrogels that respond to a specific parameter or agent. As a result, the system 300 may be applied to a wide variety of hydrogels responsive to many different stimuli from temperature to antigens.

Furthermore, the analyte detection system 300 can provide a basis for a novel hydrogel-based biological and chemical detection system that incorporates molecular or aptamer beacons which can undergo conformational changes upon binding to biomolecular targets. Moreover, the biochemical detection system 300 can be a part of a monitoring system for entropy-driven DNA circuits used as diagnostics elements in point-of-care settings. A portable or miniaturized sensor 100 can thus be developed based on the present disclosure. The operating principle of the biochemical detection system 300 according to the present disclosure uniquely combines the versatility and stimulus-specific nature of smart hydrogels with the high sensitivity, robustness and simplicity of reflective diffractometry in detecting extremely small nanoscale motions in a novel manner. Importantly, the diffraction grating is not significantly affected by the optical properties of the hydrogel itself. Due to the use of reflective coatings, a significant portion of the light is reflected back. Therefore, the detected signal represents motion of the hydrogel and not changes in the refractive index of the hydrogel itself. This motion can be easily observed through monitoring diffraction mode intensity without using bright-field or fluorescent microscopy.

Those skilled in the art will recognize that numerous modifications can be made to the above-described disclosure. Therefore, the platform is not to be limited to the specific embodiments illustrated and described above. The platform, as originally presented and as it may be amended, encompasses variations, alternatives, modifications, improvements, equivalents, and substantial equivalents of the embodiments and teachings disclosed herein, including those that are presently unforeseen or unappreciated, and that, for example, may arise from applicants/patentees and others.

We claim:

1. A reflective diffractometric hydrogel sensor comprising:
an upper layer comprising:
a microfluidic chamber formed from a substantially transparent material, bounded by an upper layer substrate on one surface, and configured to contain a solution;
a reflective diffraction grating, positioned within the microfluidic chamber, comprised of a plurality of hydrogel strips each having a top surface and a bottom surface, wherein each top surface is coated with a reflective material and each bottom surface is in contact with the upper layer substrate, and the hydrogel strips being configured to change in dimension in response to a stimulus; and
a reflective surface below the reflective diffraction grating comprising the reflective coating of the plurality of hydrogel strips;
wherein when a coherent light is incident upon and reflected from the reflective surface and the top surface of the upper layer at an angle substantially normal to the upper layer an interference diffraction pattern results, comprised of a first diffraction mode, a light intensity of which indicates the relative distance between the top surfaces of the plurality of hydrogel strips and the reflective surface.

2. The reflective diffractometric hydrogel sensor of claim 1, wherein changes in the light intensity of the resulting first diffraction mode indicate changes in a dimension of each of the plurality of hydrogel strips in the direction of the incident coherent light, and wherein the changes in the dimension of each of the plurality of hydrogel strips result from the response of each of the hydrogel strips to a stimulus.

3. The reflective diffractometric hydrogel sensor of claim 1, wherein changes in the light intensity of the resulting first diffraction mode are measured with a photodetector positioned outside the microfluidic chamber.

4. The reflective diffractometric hydrogel sensor of claim 1, wherein the reflective surface below the reflective diffraction grating is positioned on the upper layer substrate.

5. The reflective diffractometric hydrogel sensor of claim 1, wherein the reflective surface below the reflective diffraction grating is positioned on a lower layer, which comprises a lower layer substrate with the reflective surface, and is positioned at a distance from the upper layer such that the incident coherent light must pass through the reflective diffraction grating before falling incident upon the reflective surface.

6. The reflective diffractometric hydrogel sensor of claim 1, wherein the stimulus is a change of concentration of a target analyte in the solution.

7. The reflective diffractometric hydrogel sensor of claim 6, wherein the target analyte is one of hydrogen and hydroxide ions.

8. The reflective diffractometric hydrogel sensor of claim 1, wherein the distance between the upper layer and lower layer is adjustable to enable calibration and biasing of the reflective diffractometric hydrogel sensor, such that the reflective diffractometric hydrogel sensor operates in a range of preferred sensitivity.

9. The reflective diffractometric hydrogel sensor of claim 8, wherein the lower layer is positioned at a slight angle relative to the upper layer such that lateral movement of the lower layer relative to the upper layer changes vertical distances between the upper layer and the lower layer.

10. The reflective diffractometric hydrogel sensor of claim 1, wherein the microfluidic chamber further comprises an inlet and an outlet,
the inlet configured to introduce the solution containing a target analyte into the microfluidic chamber, and
the outlet configured to remove the solution from the microfluidic chamber.

11. A biological and chemical detection system comprising:
a reflective diffractometric hydrogel sensor comprising an upper layer comprising:
a microfluidic chamber formed from a substantially transparent material, bounded by an upper layer substrate on one surface, and configured to contain a solution;

a sensor reflective diffraction grating, positioned within the microfluidic chamber, comprised of a plurality of hydrogel strips each having a top surface and a bottom surface, wherein each top surface is coated with a reflective material and each bottom surface is in contact with the upper layer substrate, and the hydrogel strips being configured to change in dimension in response to a stimulus; and a reflective surface below the sensor reflective diffraction grating comprising the reflective coating of the plurality of hydrogel strips;

a pump configured to introduce that a solution containing a target analyte through the microfluidic chamber via the inlet and the outlet;

a coherent light source positioned outside the microfluidic chamber and configured to produce coherent light;

a photodetector positioned outside the microfluidic chamber configured to measure the intensity of light reflected from the reflective diffractometric hydrogel sensor;

a first beam splitter positioned between the photodetector and the coherent light source and configured to enable the coherent light to fall incident upon the reflective diffractometric hydrogel sensor but to divert a resultant diffraction pattern reflected from the reflective diffractometric hydrogel sensor to the photodetector; and a data acquisition system to interrogate a signal from the photodetector, whereby changes in the light intensity of the resultant diffraction pattern are correlated to changes in the height of the hydrogel strips.

12. The biological and chemical detection system of claim 11, wherein the reflective surface below the sensor reflective diffraction grating is positioned on a lower layer, which comprises a lower layer substrate with the reflective surface, and is positioned at a distance from the upper layer such that the incident coherent light must pass through the sensor reflective diffraction grating before falling incident upon the reflective surface.

13. The biological and chemical detection system of claim 12, wherein the lower layer is positioned at a slight angle relative to the upper layer and positioned on a biasing element, such that movement of the lower layer relative to the upper layer changes the distance between the upper layer and lower layer to enable calibration and biasing of the system.

14. The biological and chemical detection system of claim 11, further comprising a reference reflective diffraction grating configured to respond to the same stimuli as the sensor reflective diffraction grating, except that reference reflective diffraction grating is configured to not respond to a target analyte.

15. The biological and chemical detection system of claim 14, further comprising a second beam splitter configured to enable a second and parallel coherent light beam from the coherent light source to fall incident upon the reference reflective diffraction grating in the same manner as upon the sensor reflective diffraction grating.

16. The biological and chemical detection system of claim 14, wherein reflection of the second coherent light beam by the reference reflective diffraction grating forms a reference diffraction pattern, the reference diffraction pattern being capable of subtraction from the sensor reflective diffraction grating by the data acquisition system.

17. The biological and chemical detection system of claim 11, further comprising a lens positioned between the coherent light source and the reflective diffractometric hydrogel sensor and configured to focus the coherent light onto the reflective diffractometric hydrogel sensor.

18. A method, comprising:
introducing a solution containing a concentration of a target analyte into a micro fluidic chamber via an inlet of a reflective diffractometric hydrogel sensor;

allowing a predetermined amount of time for the target analyte to diffuse into each of a plurality of hydrogel strips comprising a reflective diffraction grating, a top surface of which includes a reflective coating;

focusing a coherent light source on the reflective diffraction grating to form an interference diffraction pattern resulting from the phase difference between the light reflected from the top of the reflective diffraction grating compared to light reflected from reflective surface disposed below the reflective diffraction grating;

measuring the light intensity of first diffraction mode of the resulting diffraction pattern with a photodetector;

calculating a change in the height of the plurality of hydrogel strips proportional to light intensity measured; and correlating the change in the height of the plurality of hydrogel strips to the concentration of the target analyte.

19. The method of claim 18, further comprising calibrating the reflective diffractometric hydrogel sensor by:
adjusting a biasing element coupled to the lower reflective surface, wherein the distance between the top of the reflective diffraction grating and the lower reflective surface is varied to determine an operating configuration of maximum sensitivity of a biological and chemical detection system, whereby a light intensity measurement is made of a solution containing a known concentration of the target analyte;

configuring the system to the operating configuration;
introducing a solution containing an unknown concentration of the target analyte via the inlet of a reflective diffractometric hydrogel sensor;

allowing a predetermined amount of time for the target analyte to diffuse into each of a plurality of hydrogel strips comprising a reflective diffraction grating;

focusing a coherent light source on the reflective diffraction grating to form a diffraction pattern resulting from the phase difference between the light reflected from the top of the reflective diffraction grating compared to light reflected from a lower reflective surface;

measuring the light intensity of first diffraction mode of the resulting reflected diffraction pattern with a photodetector;

calculating a change in the height of the plurality of hydrogel strips proportional to light intensity measured; and correlating the change in the height of the plurality of hydrogel strips to the concentration of the target analyte using the calibration data from solutions of known analyte concentration.

20. The method of claim 18, wherein instead of measuring the light intensity of first diffraction mode of the resulting diffraction pattern a plurality of modes are measured using a plurality of photodetectors.

* * * * *